US012614472B2

(12) United States Patent　　　　　　(10) Patent No.:　US 12,614,472 B2

Kantar　　　　　　　　　　　　　　　　(45) Date of Patent:　Apr. 28, 2026

---

(54) SYSTEMS AND METHODS FOR ACCESSIBLE COMPUTER-USER SCENARIOS

(71) Applicant: Roblox Corporation, San Mateo, CA (US)

(72) Inventor: Rebecca Kantar, Truro, MA (US)

(73) Assignee: Roblox Corporation, San Mateo, CA (US)

( * ) Notice: Subject to any disclaimer, the term of this patent is extended or adjusted under 35 U.S.C. 154(b) by 702 days.

(21) Appl. No.: 17/920,300

(22) PCT Filed: Apr. 21, 2021

(86) PCT No.: PCT/US2021/028411

§ 371 (c)(1),
(2) Date: Oct. 20, 2022

(87) PCT Pub. No.: WO2021/216718

PCT Pub. Date: Oct. 28, 2021

(65) Prior Publication Data

US 2023/0196937 A1　　　Jun. 22, 2023

Related U.S. Application Data

(60) Provisional application No. 63/013,348, filed on Apr. 21, 2020, provisional application No. 63/013,314, filed on Apr. 21, 2020.

(51) Int. Cl.
*G09B 21/00*　　　　　(2006.01)
*G06F 3/01*　　　　　(2006.01)
(Continued)

(52) U.S. Cl.
CPC ........... *G09B 21/007* (2013.01); *G06F 3/016* (2013.01); *G09B 7/00* (2013.01); *G09B 7/02* (2013.01); *G09B 9/00* (2013.01); *G10L 13/00* (2013.01)

(58) Field of Classification Search
CPC .............................. G09B 5/065; G09B 21/007
See application file for complete search history.

(56) References Cited

U.S. PATENT DOCUMENTS 5,736,978 A　　4/1998　Haser et al.
6,030,226 A　　2/2000　Hersh
　　　　　　　(Continued)

FOREIGN PATENT DOCUMENTS

KR　　10-2012-0010283　　2/2012
KR　　10-2015-0063910　　6/2015
WO　　　2018/222729　　12/2018

OTHER PUBLICATIONS

KIPO, Notice of Allowance (with English translation) for Korean Patent Application No. 10-2022-7040343, Oct. 14, 2024, 7 pages.

(Continued)

*Primary Examiner* — Peter R Egloff
(74) *Attorney, Agent, or Firm* — IP Spring

(57)　　　　　　　　ABSTRACT

Implementations described herein relate to methods, systems, and computer-readable media for accessible computer-user scenarios. For example, a method can include displaying a graphical user interface on a display screen. The graphical user interface includes a virtual assessment, the virtual assessment is representative of an assessment examination, and the graphical user interface further comprises a graphical region that represents a portion of a logical problem of the assessment examination. The method can also include determining placement and/or alignment of an embossed screen overlay that allows a visually-disabled person to interact with the computer.

20 Claims, 9 Drawing Sheets

(51) Int. Cl.

| | | |
|---|---|---|
| *G09B 7/00* | (2006.01) | |
| *G09B 7/02* | (2006.01) | |
| *G09B 9/00* | (2006.01) | |
| *G10L 13/00* | (2006.01) | |

(56) References Cited

U.S. PATENT DOCUMENTS

| | | | | |
|---|---|---|---|---|
| 8,633,907 | B2 | 1/2014 | Mahalingam | |
| 2002/0155419 | A1* | 10/2002 | Banerjee | G09B 7/00 |
| | | | | 434/322 |
| 2005/0175974 | A1* | 8/2005 | Hansen | G09B 7/00 |
| | | | | 434/362 |
| 2007/0117070 | A1 | 5/2007 | Krass | |
| 2009/0217164 | A1 | 8/2009 | Beitle et al. | |
| 2010/0182242 | A1* | 7/2010 | Fields | G06F 3/016 |
| | | | | 345/169 |
| 2010/0328231 | A1 | 12/2010 | Pasquero et al. | |
| 2012/0007809 | A1 | 1/2012 | Mahalingam | |
| 2012/0221251 | A1 | 8/2012 | Rosenberg et al. | |
| 2015/0331528 | A1* | 11/2015 | Robinson | G06F 3/0482 |
| | | | | 345/173 |
| 2018/0018630 | A1 | 1/2018 | Oni | |
| 2019/0156703 | A1* | 5/2019 | White | G06F 3/04886 |
| 2021/0117001 | A1* | 4/2021 | Kadambi | G09B 21/003 |

OTHER PUBLICATIONS

EPO, Extended European Search Report for European Patent Application No. 21792280.6, May 3, 2024, 10 pages.
KIPO, First Office Action (with English translation) for Korean Patent Application No. 10-2022-7040343, May 14, 2024, 12 pages.
USPTO, International Search Report for International Patent Application No. PCT/US2021/028411, Jul. 21, 2021, 2 pages.
USPTO, Written Opinion for International Patent Application No. PCT/US2021/028411, Jul. 21, 2021, 6 pages.

* cited by examiner

Figure 1:
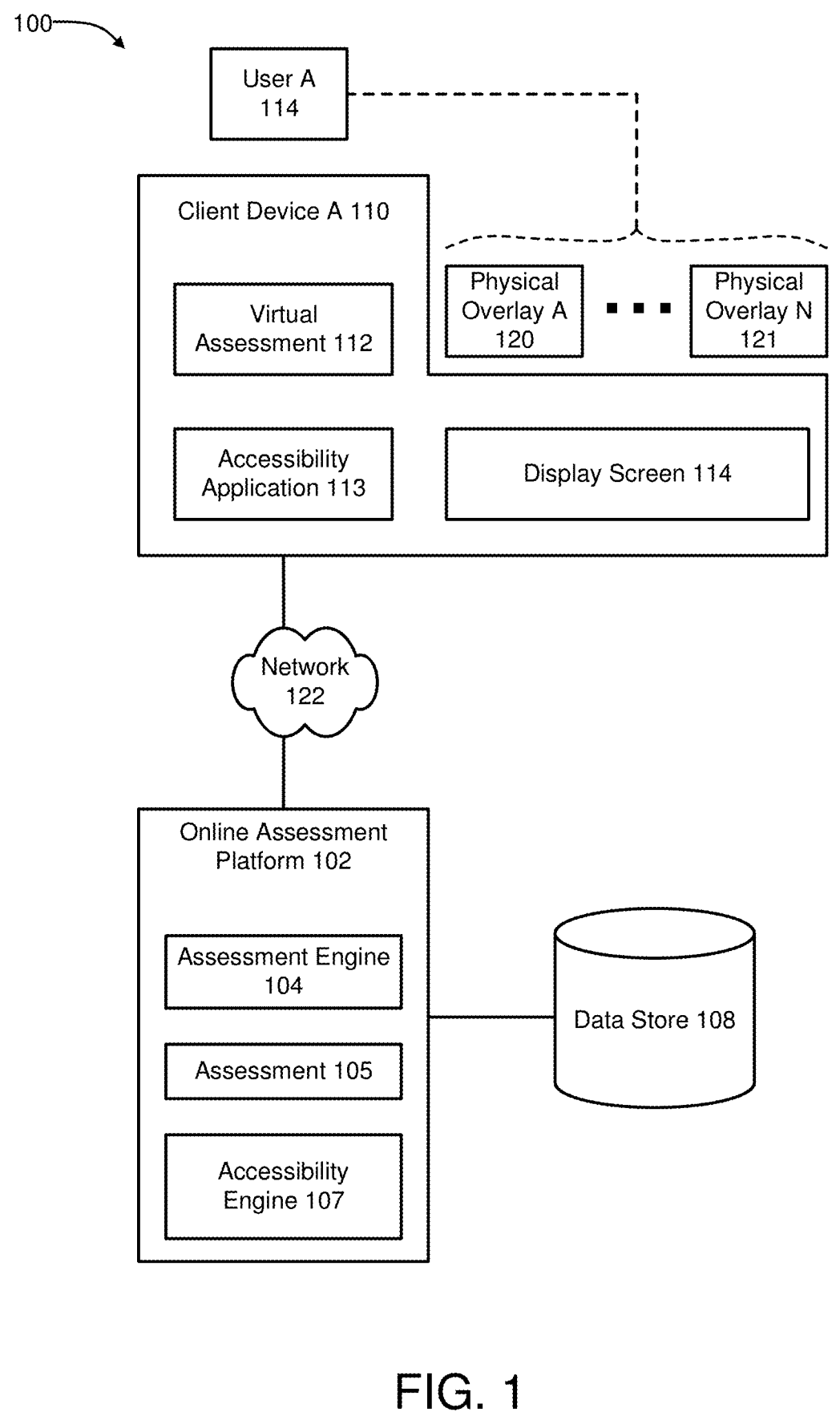

100

User A
114

Client Device A 110

Virtual
Assessment 112

Physical
Overlay A
120

● ● ●

Physical
Overlay N
121

Accessibility
Application 113

Display Screen 114

Network
122

Online Assessment
Platform 102

Assessment Engine
104

Assessment 105

Accessibility
Engine 107

Data Store 108

| User ID | Assessment Score $(S_1, S_2, ..., S_n)$ |
|---------|------------------------------------------|
| U1 | Aggregated Score |
| U2 | Aggregated Score |
| ... | ... |
| Un | Aggregated Score |

SYSTEMS AND METHODS FOR ACCESSIBLE COMPUTER-USER SCENARIOS

CROSS-REFERENCE TO RELATED PATENT APPLICATIONS

The present application is the U.S. National Stage filing under 35 U.S.C. § 371 of International Patent Application No. PCT/US2021/028411, filed on Apr. 21, 2021, which in turn claims the benefit of priority to U.S. Provisional Patent Application Ser. No. 63/013,348, entitled "Systems and Methods for Accessible Game-User Interactions," filed on Apr. 21, 2020, and U.S. Provisional Application Ser. No. 63/013,314, entitled "Systems and Methods for Accessible Game-Based Scenarios," filed on Apr. 21, 2020, the entire contents of each of which are hereby incorporated by reference herein.

TECHNICAL FIELD

Embodiments relate generally to computer use by individuals with limited accessibility, and more particularly but not exclusively, to methods, systems, and computer readable media for accessible computer-user scenarios.

BACKGROUND

Traditional standardized cognitive assessments primarily evaluate content mastery or domain knowledge, processing speed, and memory. The College Entrance Examination Board, now the College Board, was established in 1923 to define a set of college admission standards through the dissemination of the Scholastic Aptitude Test (SAT). In 1959, the American College Test (ACT) was released as an alternative to the SAT. Both the ACT and the SAT focus on standardized content in mathematics, writing, science, and other subject-specific areas to create objective metrics. While widely adopted across the United States, these assessments reveal little about an individual's specific cognitive abilities.

In response to the shortcomings in both the methodology and substance of traditional standardized college admissions tests, employers have adopted other traditional cognitive ability or intelligence tests in an effort to glean more predictive insights on applicants' cognitive profiles. However, these assessments, like standardized admissions tests, also focus on content mastery or domain knowledge, processing speed, and memory. These factors ignore the increasing need to develop and measure capabilities required by the 21st-century workforce.

Though conventional assessment providers may administer digital assessments, their assessments are susceptible to accessibility issues for fully blind or other visually impaired test takers. For example, under the Americans with Disabilities Act (ADA), assessment programs are required to provide accommodations for such test takers. These conventional assessment providers have struggled to resolve accessibility issues for fully blind or other visually impaired test takers in their digital assessments.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to accessible computer-user scenarios. In some implementations, a computer-implemented method comprises: displaying a graphical user interface on a display screen, wherein the graphical user interface comprises a virtual assessment, wherein the virtual assessment is representative of an assessment examination, and wherein the graphical user interface further comprises a graphical region that represents a portion of a logical problem of the assessment examination; receiving a first signal indicative of placement of a first physical overlay onto the display screen; determining, based on the first signal, that the first physical overlay is at least partially aligned with the graphical region; receiving and storing computer-user interactions between a user that physically interacts with the at least partially aligned first physical overlay and the graphical user interface; based on the computer-user interactions, audibly prompting for replacement of the first physical overlay with another physical overlay; and generating telemetry data that may inform an item-level score based on the stored computer-user interactions.

In some implementations, the another physical overlay is a second physical overlay, wherein the graphical region is a first graphical region, and wherein the method further comprises: generating a second graphical region in the graphical user interface; determining that the second physical overlay is at least partially aligned with the second graphical region; receiving and storing additional computer-user interactions between a user that physically interacts with the at least partially aligned second physical overlay and the graphical user interface; and generating a complete assessment score based on the stored computer-user interactions and the additional computer-user interactions.

In some implementations, the assessment examination is a test for assessment of a student or a vocational assessment examination for assessment of a vocational candidate.

In some implementations, the graphical user interface further comprises one or more instructional elements comprising indicia that represent instructions to complete the virtual assessment, and wherein the first physical overlay comprises one or more braille embossments that represent the indicia.

In some implementations, the method further comprises: generating an audio file using a speech synthesizer, wherein the audio file comprises one or more segments of synthesized speech of the instructions to complete the virtual assessment; and audibly playing the audio file.

In some implementations, the method further comprises: generating an audio file using a speech synthesizer, wherein the audio file comprises one or more segments of synthesized speech that describe the logical problem; and audibly playing the audio file responsive to receiving the first signal.

In some implementations, the method further comprises: generating an audio file using a speech synthesizer, wherein the audio file comprises one or more segments of synthesized speech that describe the graphical region; and audibly playing the audio file responsive to determining that the first physical overlay is at least partially aligned with the graphical region.

In some implementations, the first physical overlay comprises: an embossed border region configured to be aligned with edges of the display screen; and an embossed inner region that includes at least one or more of: texture that represents edges of the graphical region, features identifiable by touch that represent edges of the graphical region, or braille embossing that describes at least a portion of the graphical region.

In some implementations, the method further comprises periodically audibly playing synthesized speech that describes a state of the virtual assessment.

In some implementations, the method further comprises periodically applying haptic feedback responsive to the computer-user interactions.

According to another aspect, a system of accessible game-user scenarios comprises: a display device configured to display a graphical user interface, wherein the graphical user interface comprises a virtual assessment, wherein the virtual assessment is representative of an assessment examination, and wherein the graphical user interface further comprises a graphical region that represents a portion of a logical problem of the assessment examination; a memory with instructions stored thereon; and a processing device, coupled to the memory and to the display device, wherein the processing device is configured to access the memory and execute the instructions, and wherein the instructions, in response to execution by the processing device, cause the processing device to perform or control performance of operations comprising: receiving a first signal indicative of placement of a first physical overlay onto the display screen; determining, based on the first signal, that the first physical overlay is at least partially aligned with the graphical region; receiving and storing computer-user interactions between a user that physically interacts with the at least partially aligned first physical overlay and the graphical user interface; based on the computer-user interactions, audibly prompting for replacement of the first physical overlay with another physical overlay; and generating a portion of an assessment score based on the stored computer-user interactions.

In some implementations, the first physical overlay comprises: an embossed border region configured to be aligned with edges of the display screen; and an embossed inner region that includes at least one or more of: texture that represents edges of the graphical region, features identifiable by touch that represent edges of the graphical region, or braille embossing that describes at least a portion of the graphical region.

In some implementations, the system further comprises an embossing or Braille printing apparatus configured to physically print one or more copies of the first physical overlay.

In some implementations, the operations further comprise: generating a data file representative of a printing sequence of a copy of the first physical overlay; and transmitting the data file to the embossing or Braille printing apparatus.

In some implementations, the another physical overlay is a second physical overlay, wherein the graphical region is a first graphical region, and wherein the operations further comprise: generating a second graphical region in the graphical user interface; determining that the second physical overlay is at least partially aligned with the second graphical region; receiving and storing additional game-user interactions between a user that physically interacts with the at least partially aligned second physical overlay and the graphical user interface; and generating a complete assessment score based on the stored game-user interactions and the additional game-user interactions.

In some implementations, the assessment examination is a test for assessment of a student or a vocational assessment examination for assessment of a vocational candidate.

In some implementations, the graphical user interface further comprises one or more instructional elements comprising indicia that represent instructions to complete the virtual assessment, and wherein the first physical overlay comprises one or more braille embossments that represent the indicia.

In some implementations, the operations further comprise: generating an audio file using a speech synthesizer, wherein the audio file comprises one or more segments of synthesized speech of the instructions to complete the virtual assessment; and audibly playing the audio file.

In some implementations, the operations further comprise: generating an audio file using a speech synthesizer, wherein the audio file comprises one or more segments of synthesized speech that describe the logical problem; and audibly playing the audio file responsive to receiving the first signal.

In some implementations, the operations further comprise: generating an audio file using a speech synthesizer, wherein the audio file comprises one or more segments of synthesized speech that describe the graphical region; and audibly playing the audio file responsive to determining that the first physical overlay is at least partially aligned with the graphical region.

BRIEF DESCRIPTION OF THE DRAWINGS

FIG. 1 is a diagram of an example network environment for accessible computer-user scenarios, in accordance with some implementations.

FIG. 5 illustrates an example data structure for aggregating user assessment scores, in accordance with some implementations.

DETAILED DESCRIPTION

Figure 2:
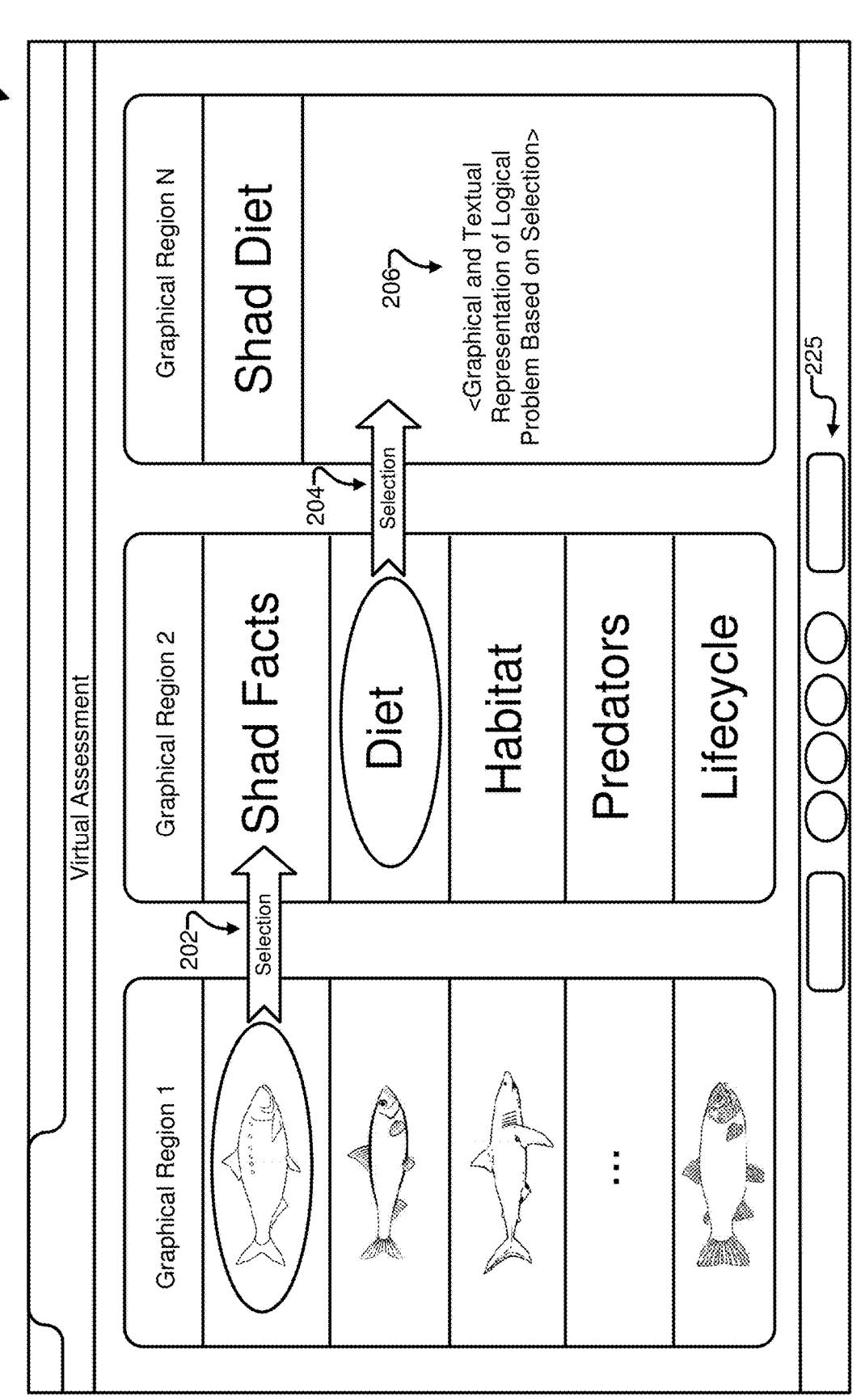
FIG. 2 is a schematic of an example graphical user interface (GUI) for accessible computer-user scenarios, in accordance with some implementations.

One or more implementations described herein relate to accessibility of computers and associated graphical user interfaces (GUIs). Features can include automatically determining alignment of a physical overlay placed onto a display device, and manipulating computer-generated output such as: audio, haptic feedback, speech synthesis, and other output(s), based upon computer-user interactions with the physical overlay and the underlying GUI. The physical overlay can be easily grasped, realigned, and interpreted by users who are partially or fully visually impaired, as well as users who have vision affected by other factors.

It may be appreciated that the rise of automation has made content mastery or domain knowledge, processing speed, and memory less relevant features of human cognition in the context of an individual's preparedness for modern work and life. Instead, higher level, complex cognitive abilities, such as problem-solving, creativity, systems thinking, and critical thinking, have become more relevant features that make a difference in the individual's preparedness for modern work and life. In some aspects, systems and methods are provided for a simulation-based assessment that focuses on evaluating how an individual thinks instead of what the individual knows. Scenarios or tasks may be embedded within the simulation-based assessment that abstract the context of a given environment, e.g., a work environment, while maintaining opportunities for a user to portray problem-solving capabilities required by a job. Through scenarios that take place in the simulation-based assessment, details of a user's cognitive processes, not just end choices, may be observed.

Generally, the simulation-based assessment includes one or more scenarios. The scenarios may be based on any assessment's logical problems that are translated into a virtual assessment. According to one example, a natural world abstraction may be used as a scenario. According to other examples, an abstracted non-natural setting may be used as a scenario. Still further, according to other examples, contextual clues referencing logical problems may be used as a scenario. These and other settings may be applicable depending upon an implementation.

Additionally, variation in the distinct views and scenes for different versions of scenarios can be data-driven. Implemented systems may generate distinct views and scenes for different versions of scenarios using the logic associated with potential animals, plants, and terrain features in ways that adhere to human expectations. Further, assets that are informed by the data should be realistic. The system may account for the properties of each asset slotted to populate the scene. For example, in the generated scenario, animals that should swarm, swarm, and animals that should fly, fly, while animals that should mingle and meander, navigate the terrain as they would in real life. Everything less obvious in our daily perception of nature, plants, rocks, or the slope of terrain, may adhere to real-world rules as well so that the background of scenes in scenarios stays in the background of assessment.

As a user interacts with the assessment, information may be recorded regarding how the user approaches the task and/or the processes in which the user solves and engages in during the task. The recorded information may include the user's telemetry data, e.g. mouse movements, clicks, choices, timestamps, and other suitable telemetry data. The user's telemetry data may be analyzed to examine the user's cognitive processes and/or overall performance. In addition to analysis of the user's telemetry data for correct or incorrect answers, the user's telemetry data may be analyzed to understand how the user solved a problem and/or what strategies he or she engaged in to solve the problem. This novel approach to cognitive testing in a given domain, e.g., the education domain, may provide an abundance of information to better assess which candidates are likely to succeed in a given field of study.

The system may also implement a consistent calibration method for reconciling predicted complexity for scenarios with actual difficulty distributions to leverage automated item generation at scale across different scenarios. To derive the relationship between computational complexity and difficulty distributions, the system may receive as many reasonable parameters as possible to account for system variable, components of scenarios that our system serves up deterministically, and human variables, what test-takers do in a scenario. Using more data throughout test development and iteration, the system may implement complexity estimator algorithms that get better at approximating human behavior.

Additionally, assessment scores are determined to quantify how a user's actions, timestamps, and performance within each scenario relate to various cognitive constructs. Cognitive science, educational psychology, and learning science theories may guide the mapping of each score to relevant constructs. The scores may focus both on the product (e.g., right or wrong) and on the process (e.g., how did they get there, what choices did they make, how many mistakes did they correct), which is more nuanced than traditional cognitive assessments.

The simulation-based assessments are also susceptible to accessibility issues for fully blind or other visually impaired test takers. In the United States, the ADA requires all state summative assessment programs to provide accommodations for fully blind or other visually impaired test takers. For years, the required accessibility accommodations have often proven too challenging for conventional assessment providers to solve for when attempting to innovate towards next generation item types. This has also prevented conventional assessment providers from building such aspects for use in large-scale assessment programs.

Accordingly, the systems, methods, and apparatuses described herein address accessible the accommodation case to make a game-based or computer-based scenario, including spatial features, user interface layouts, and positional information, accessible to fully blind and other visually impaired test-takers. In some aspects, this involves using a Braille embosser (or embossing by hand or another suitable means) to print tactile graphics on a clear, touch-screen compatible piece of plastic (or similar material) that serves as an overlay, allowing visually impaired students to interact with the overlay and a tablet (or another suitable computing device).

For example, a series of overlays may be printed, some with user interface components, others with art assets, others with full scenes depicted, for a human proctor to use according to a set of rules dictating when to use each overlay. The rules may be provided at assessment administration via real-time, in assessment prompts for the proctor.

As the GUI changes on the display screen, the proctor may receive a notification or be otherwise recruited to replace the current overlay with a different overlay corresponding to the currently displayed user interface. Thus, the proctor may switch out the overlay with another one that is supposed to be over the display screen for that particular portion of an assessment.

While a tablet computer with a screen reader, or another suitable computing device hosting the assessment, can be provided to the student, they might find it hard to interact with the game-based scenario with just screen reader input to read out elements on the display screen.

Unlike visually able persons, fully blind or other visually impaired students cannot see what they are interacting with on the display screen, where it is on the display screen, etc. With just a screen reader, the student's experience may not be suitable because they cannot see what they are supposed to be interacting with, e.g., they would have no way of knowing where a graphical element is positioned in the display screen. The described systems and methods enable the student to interact with different fields of data, graphical elements, and other elements, to more intuitively understand where things are spatially located on the screen.

Generally, a system can include a computing device with a display screen. An overlay is provided and is configured to be disposed on the display screen. The overlay corresponds to a user interface currently displayed on the display screen and includes embossed text, one or more embossed outlines corresponding to one or more user interface elements of the user interface, as well as any other physically tactile embossments that increase usability for blind or partially-blind students. For example, the embossed text may include Braille text or another suitable form of text readable by a fully blind or other visually impaired person. The overlay may allow visually impaired students to touch or feel with a finger over all Braille while still using touch screen interactions (e.g., clicking, scrolling, etc.) on the device displaying the assessment.

This described functionality is both technically beneficial and advantageous because an assessment can therefore generate the same categorical scoring inputs as other scenarios typically generate, e.g., those offered to students who are not fully blind or visually impaired. Braille overlays may also allow visually impaired students to interact with the same or similar test, the same or similar user interface, and the same or similar graphics as their visually able peers. When students click within the user interface components, a screen reader or audio announcements may inform them of the contents in those components. For example, a series of overlays may include Braille text for subject headers, e.g., species selection library, and/or Braille embossed outlines where different windows are, e.g., selecting plants or animals for the ecosystem. The student can receive the same user interface as a visually able student, but be able to feel the user interface as a layered board and feel the outlines of the different regions or elements.

For example, a blind student can navigate to a region of a GUI and select a component, audibly hear the component description, properties, and other features displayed on the GUI. Furthermore, while traversing or interacting, haptic feedback may be provided to further enhance the experience. The combination of an embossed overlay, underlying GUI, as well as use of audio announcements and haptic feedback, make the information portrayed very accessible to blind or partially blind students. Furthermore, the embossed overlay is a universal, inexpensive, and practical apparatus for large scale assessment programs.

The embossed text of the physical overlay may include an identifier (both visually readable as well as tactile) indicating that the overlay corresponds to the user interface currently displayed on the display screen. Additionally or alternatively, the display screen may display an identifier indicating that the overlay corresponds to the user interface currently displayed on the display screen. The student may use different overlays to navigate across different screens with different components, e.g., different windows, different filters, different components, etc. For example, the display screen may show a prompt and/or generate an audio prompt to place a first overlay over the display screen. The proctor or student can pick up the overlay labeled with the corresponding number, e.g., in embossed text, Braille text, printed text, or other suitable text. The proctor or another suitable party may use this information to ensure that the correct overlay is provided for the currently displayed user interface.

Similarly, when the display screen changes, the system may generate a prompt with the identifier to request a change to the overlay corresponding to the displayed identifier. The overlays may be prepared beforehand and match the user interfaces in the assessment as they are displayed on the display screen. In some embodiments, if a portion of the user interface is selected that does not correspond to any of the user interface components or elements, this may mean that an incorrect overlay has been provided. In this case, the system may generate a prompt to request confirmation that the correct overlay has been provided such that it corresponds to the currently displayed user interface.

As part of the simulation-based assessment, the system may capture telemetry data including a fully blind or other visually impaired person's interactions with the user interface using the movable object. The telemetry data may be used to generate a score for the fully blind or visually impaired person taking the simulation-based assessment. The telemetry data collected on fully blind or other visually impaired students can capture a subtle trail of data that can be used to create the scores. The system can still capture the student interacting with the layout and clicking, finger movements, screen reader, etc., similar to their visually-able peers. This allows the system to create same or similar types of testing experiences and collect the same or similar data across all persons, disabled or otherwise. The system may use this telemetry data and use an automated scoring algorithm to generate same or similar types of scores for all persons, disable or otherwise.

The simulation-based assessment can be deployed locally in a secure, proctored environment. The simulation-based assessment can also be deployed remotely via timed releases where users may participate across any number of locations. In some implementations, to ensure that no two assessments are the same, artificial intelligence (AI) approaches may be applied to the process of scenario generation. Data-driven properties referenced across different scenarios may be varied in order to build unique versions of those scenarios. Each user who takes the simulation-based assessment may receive a unique task instance that, on the surface, is varied by its individual properties, complexity, and visual design, while structurally every task instance remains consistent in its assessment. While cheating and gaming remains a significant challenge facing many traditional cognitive assessments, the AI and data-driven architecture of the simulation-based assessment may protect against cheating and gaming of the assessment. For example, because each user who takes the simulation-based assessment may receive a unique task instance, it may be harder for a given user taking the simulation-based assessment to benefit from another user's responses to one or more tasks in the simulation-based assessment.

Hereinafter, components of the above-referenced system, methods, and apparatuses are described more fully with reference to FIG. 1.

FIG. 1: System Architecture

FIG. 1 illustrates an example network environment 100, in accordance with some implementations of the disclosure. The network environment 100 (also referred to as "system" herein) includes an online assessment platform 102, a client device 110, and a network 122. The online assessment platform 102 can include, among other things, an assessment engine 104, one or more assessments 105, an accessibility engine 107, and a data store 108. The client device 110 can include a virtual assessment 112, an accessibility application 113, and a display screen 114, to interact with the online assessment platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable storage medium (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online assessment platform 102 can include a server having one or more computing devices (e.g., a cloud computing system, a rackmount server, a server computer, cluster of physical servers, virtual server, etc.). In some implementations, a server may be included in the online assessment platform 102, may be an independent system, or may be part of another system or platform.

In some implementations, the online assessment platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online assessment platform 102 and to provide a user with access to online assessment platform 102. The online assessment platform 102 may also include a website (e.g., one or more webpages) or application back-end software that may be used to provide a user with access to content provided by online assessment platform 102. For example, users (or proctors) may access online assessment platform 102 using the accessibility application 113 on client device 110, respectively.

In some implementations, online assessment platform 102 may provide connections between one or more assessment providers and/or employers that allows proctors (e.g., the persons administering an assessment) to communicate with other proctors via the online assessment platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., testing or assessment user) being an entity controlled by a set of users or a group being assessed as to work skills and communication skills. For example, a set of individual users federated as a group being assessed may be considered a "user," in some circumstances.

In some implementations, online assessment platform 102 may include digital asset and digital assessment generation provisions. For example, the platform may provide administrator interfaces allowing the design, modification, unique tailoring for individuals, and other modification functions. In some implementations, assessments may include two-dimensional (2D) games, three-dimensional (3D) games, virtual reality (VR) games, or augmented reality (AR) games, for example. In some implementations, assessment creators and/or proctors may search for assessments, combine portions of assessments, tailor assessments for particular activities (e.g., group assessments), and other features provided through the assessment platform 102.

One or more physical overlays A through N (120-121) can be provided by the online assessment platform 102 in either data file format or direct print format. In some implementations, an assessment 105 can include an electronic file that can be executed or loaded using software, firmware, or hardware configured to generate a physical print of the physical overlay (e.g., Braille or embossing printing apparatus). In some implementations, a virtual assessment 112 may be executed and an assessment 105 proctored in connection with an assessment engine 104. In some implementations, an assessment 105 may have a common set of rules or common goal, and the virtual environments of the assessment 105 share the common set of rules or common goal. In some implementations, different assessments may have different rules or goals from one another.

Using the physical overlays 120-121, the user 114 may interact with the virtual assessment 112 such that touch, haptic, audio, and other feedback is provided. As described above, if the virtual assessment includes activates related to a natural environment, the physical overlays 120-121 may be representative of a particular portion of the GUI describing the natural environment, such as, for example, regions with trees, grass, mountains, or other environmental features. While interacting with the GUI through the overlay, the student may "feel" borders and regions, interpret Braille instructions, depress, click, and swipe at the overlay, all while interacting with the underlying GUI. Through replacement of the physical overlays 120-121 over the display screen 114 (e.g., using capacitive sensors to determine positioning of the object), the client device 110 may provide multiple new interfaces offering an intuitive, natural assessment process by which a person may interact while more aware of the assessment as compared to traditional, audio-only proctoring.

In some implementations, online assessment platform 102 or client device 110 may include the assessment engine 104 or virtual assessment 112. In some implementations, assessment engine 104 may be used for the development or execution of assessments 105. For example, assessment engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the assessment engine 104 may generate commands that help compute and render the assessment (e.g., rendering commands, collision commands, physics commands, etc.).

The online assessment platform 102 using assessment engine 104 may perform some or all the assessment engine functions (e.g., generate physics commands, rendering commands, etc.), or offload some or all the assessment engine functions to assessment engine 104 of client device 110 (not illustrated). In some implementations, each assessment 105 may have a different ratio between the assessment engine functions that are performed on the online assessment platform 102 and the assessment engine functions that are performed on the client device 110.

In some implementations, assessment instructions may refer to instructions that allow a client device 110 to render graphics, and other features of an assessment, such as a natural world rendering having a logical problem represented therein. The instructions may include one or more of user input (e.g., physical overlay positioning), character position and velocity information, or commands (e.g., physics commands, rendering commands, collision commands, etc.). The instructions may be audibly prompted by an assessment proctor, audibly presented by a speech synthesizer, physically represented by haptic feedback (e.g., vibration at borders, misalignment, etc.), or a combination of the same.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online assessment platform 102 at any given moment. It may be noted that the single client device 110 is provided as illustration, rather than limitation. In some implementations, any number of client devices 110 may be used.

In some implementations, each client device 110 may include an instance of the virtual assessment 112. The virtual assessment 112 may be representative of an educational assessment examination, a vocational assessment examination, or any suitable assessment, whether standardized or uniquely tailored to a particular individual or group of individuals. While described herein as related to visually-impaired persons, it should be understood that the attributes of the physical overlays, haptic feedback, speech synthesis, and visual representation of the GUI on the display screen 114 allow any person with at least one functioning hand to at least partially interact with an equivalent assessment form and therefore perform the assessments 105.

In some implementations, a user may login to online assessment platform 102 via the accessibility application 113. The user may access a user account by providing user account information (e.g., username and password) wherein the user account is associated with one or more assessments 105 of online assessment platform 102. The username and password may also be replaced by photo ID or other identification with assistance from a proctor.

In general, functions described as being performed by the online assessment platform 102 can also be performed by the client device(s) 110, or a server, in other implementations if appropriate. In addition, the functionality attributed to a particular component can be performed by different or multiple components operating together. The online assessment platform 102 can also be accessed as a service provided to other systems or devices through appropriate application programming interfaces (APIs) for customized assessments or private assessments, and thus is not limited to use in websites.

In some implementations, online assessment platform 102 may include an accessibility engine 107. In some implementations, the accessibility engine 107 may be a system, application, or module that provides computer-executable instructions or functions to facilitate use of speech synthesis, haptic feedback, and any other available feature to make assessments more intuitive for visually impaired persons.

As described briefly above, the assessments 105 may be created, modified, and proctored to persons with disabilities. The assessments 105 (and any associated data files representative of the physical overlays 120-121) may be stored in data store 108. Additionally, according to one implementation, any data files associated with the physical overlays 120-121 may be transmitted to any physical location of assessment such that recreations, copies, or physical prints of the physical overlays 120-121 may be made. The assessments may be representative of logical problems to judge or assess a person, and may include a GUI. Hereinafter, a more detailed description of an example GUI is provided with reference to FIG. 2.

FIG. 2: Virtual Assessment GUI

FIG. 2 is a schematic of a graphical user interface (GUI) 200 for accessible computer-user interactions, in accordance with some implementations. The GUI 200 may include, at a minimum, one or more graphical regions 1 through N. Generally, the graphical regions may be read aloud by a proctor. Alternatively, or in combination, a speech synthesizer on client device 110 may provide an audio description of the graphical regions, for example, by synthesizing speech portions and playing them back via computer audio. Recorded audio may be played back in some embodiments.

During assessment, an objective may include selecting (e.g., identified as 202, 204) separate portions of each graphical region to reach a graphical and textual representation of a logical problem, identified as 206. This representation may vary in many ways.

For example, the representation may allow a student to select a particular species of animal to attempt to solve a problem in a natural environment. While considering each animal displayed in graphical region 1, the student may select information from graphical region 2 such that an informed choice is made.

In addition to the dynamic graphical regions provided, additional graphical elements 225 may be presented for overlapping control functionality, e.g., pause assessment, move to next portion, ask for help, or other similar features.

It should be understood that the actual visual characteristics, placement of elements, locations of avatars/playable features, and other aspects of the GUI 200 are dynamic and may be customized for any particular assessment. Therefore, the form illustrated in FIG. 2 is not restrictive of all embodiments, but rather represents a single use-case for aiding in understanding of the aspects of this disclosure.

As described above, physical overlays may be manipulated to alter the graphical elements displayed in GUI 200. Hereinafter, a more detailed description of an example physical overlay is provided with reference to FIG. 3A and FIG. 3B.

FIG. 3: Physical Overlays

Figure 3A:
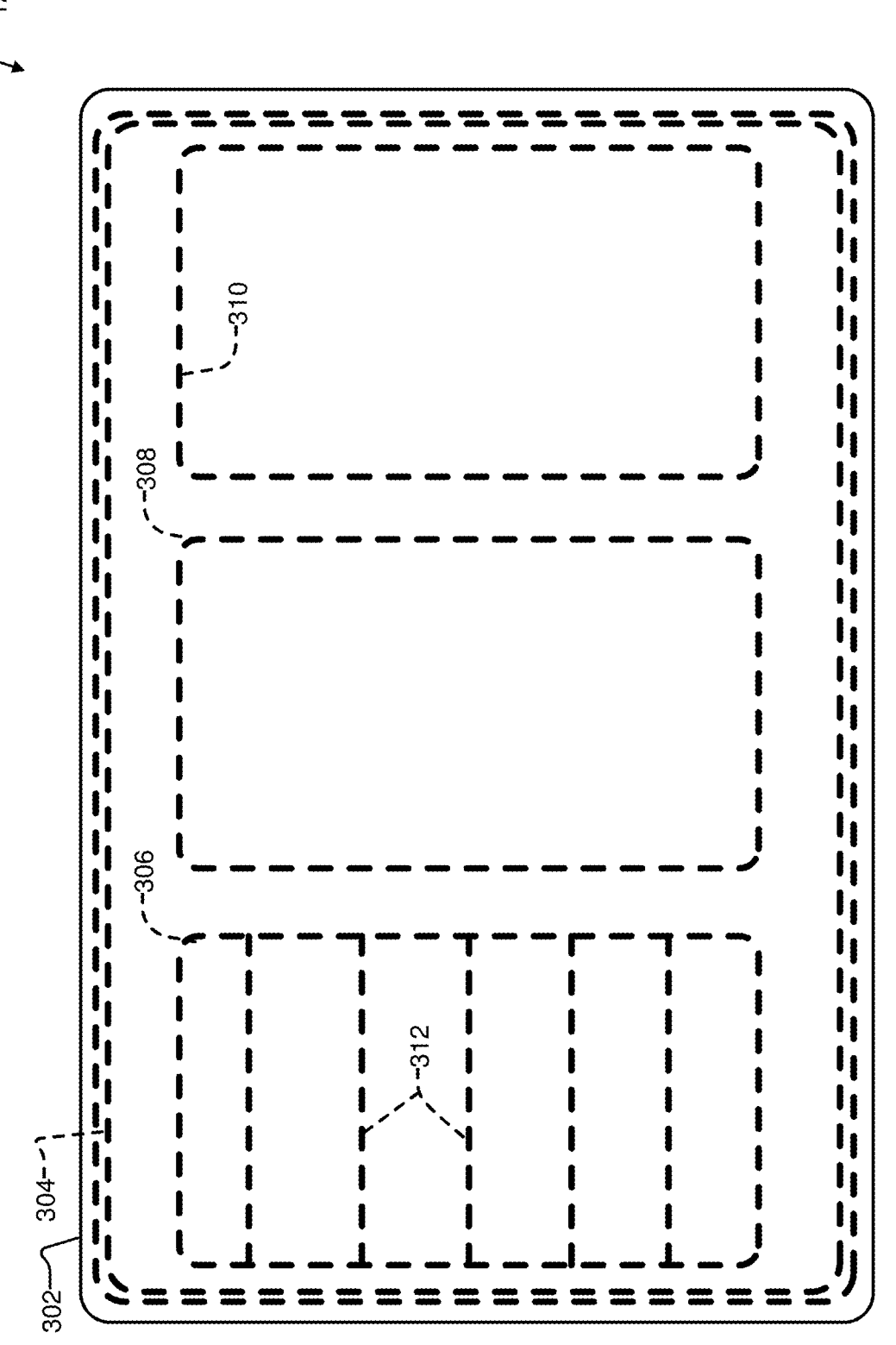
FIG. 3A is schematic of an example physical overlay for accessible computer-user scenarios, in accordance with some implementations.
Figure 3B:
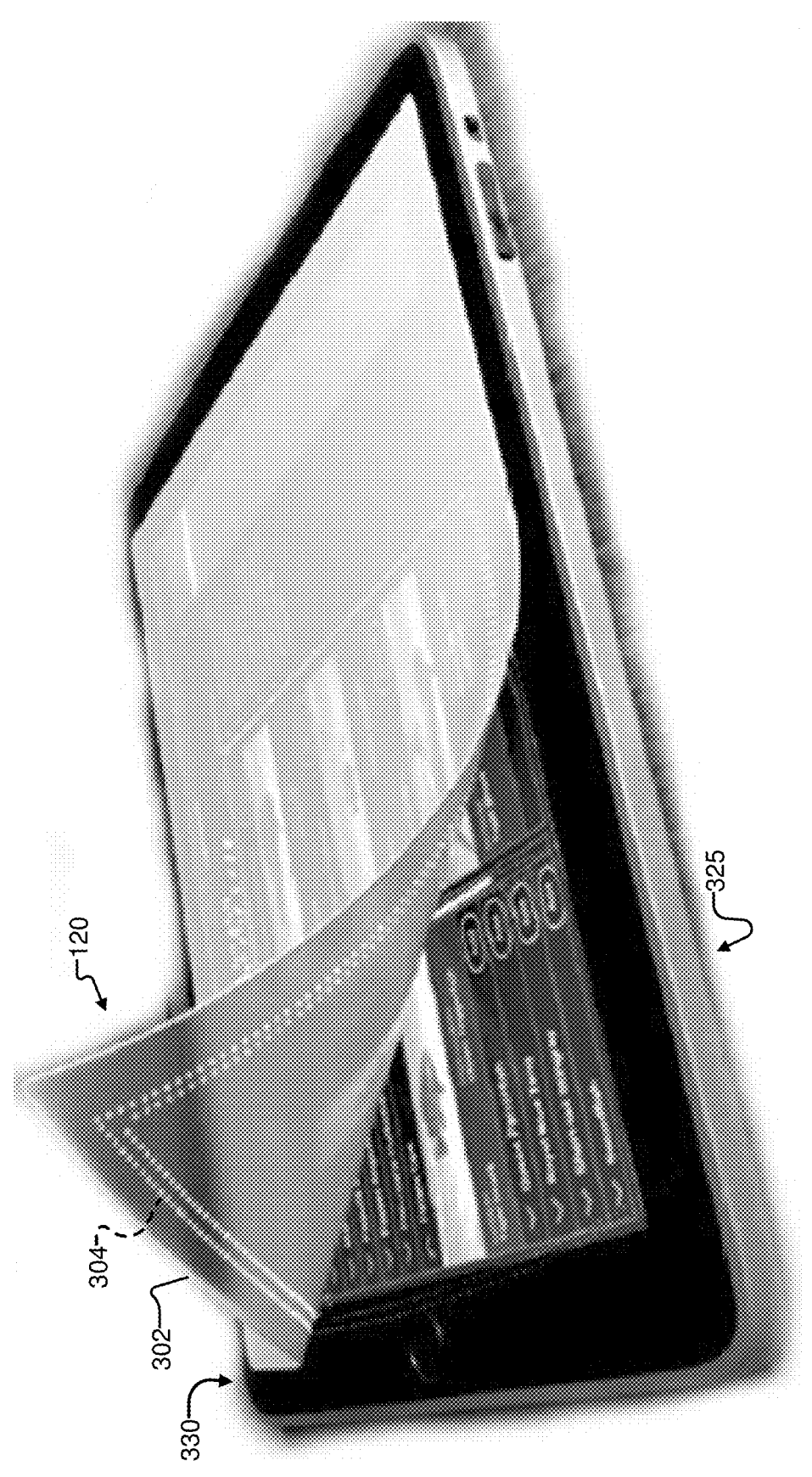
FIG. 3B is a view of a physical overlay being aligned with a display device, in accordance with some implementations.

FIG. 3A is a plan view of a physical overlay 120 for accessible computer-user scenarios, in accordance with some implementations. FIG. 3B is a view of a physical overlay being aligned with a display device, in accordance with some implementations. It should be understood that the particular form illustrated in FIGS. 3A and 3B may be varied in many ways. Accordingly, while a particular physical overlay is illustrated, any physical overlay may be applicable.

The physical overlay 120 may include an outer border 302 cut from a larger piece of material. The outer border may be a defined edge representative of an underlying or intended display screen. According to one implementation, the dimensions of the border 302 are substantially similar to the dimensions of a targeted display device, such as a particular tablet computer. According to one implementation, the dimensions of the border 302 maintain a ratio consistent with a standard tablet computer device associated with an instructional institution, such as a particular school. In this manner, the overlays may be used by all students possessing a particular tablet. Additionally, data files representing the physical overlay 120 may include template options that automatically increase, decrease, or otherwise modify the dimensions based on a targeted display device.

The physical overlay 120 may further include embossed regions 306, 308, and 310 that correspond to particular graphical regions 1, 2, and N of the GUI 200. Accordingly, the embossed regions 306, 308, and 310 may differ depending upon the particular GUI corresponding to a particular assessment.

The embossed regions 306, 308, and 310 have defined raised edges or embossments that delineate the corresponding graphical regions. These embossments may be formed by any suitable method, including hand-embossing using an embossing roller. Furthermore, in some implementations, interior embossments 312 may be included to identify sub-regions of the graphical regions 1, 2, and N, such that a blind or partially-blind student may readily identify both a number of individual sub-regions as well as their associated borders.

According to one implementation, the physical overlay 120 may include one or more areas where at least partially conductive traces of conductive tape or paint may be applied. In this manner, the at least partially conductive traces may be used in automatic determination of alignment of the physical overlay 120 to a portion of an underlying GUI graphical region. It is noted that not all implementations may include conductive traces or conductive elements, and alignment determination may also be facilitated by visual inspection by an assessment proctor or another person.

According to one implementation, the physical overlay 120 is a customized 3D printed overlay that can be represented with a data file stipulating how an additive or subtractive printing apparatus can recreate the object 120. For example, a printing sequence may be described by the data file that allows the printing apparatus to deposit (or remove) layers of material until the physical overlay 120 is created (or recreated). According to an additional implementation, the physical overlay 120 is a customized 3D printed overlay that can be represented with a data file stipulating how a Braille or embossing printer can emboss and cut the overlay 120 to an appropriate size. Additionally, the overlay 120 may be formed of plastic, rubber, translucent paper, or any other at least partially flexible material that can be embossed.

The physical overlays may be distributed to persons being assessed for use in conducting an assessment, as described more fully below.

Figure 4:
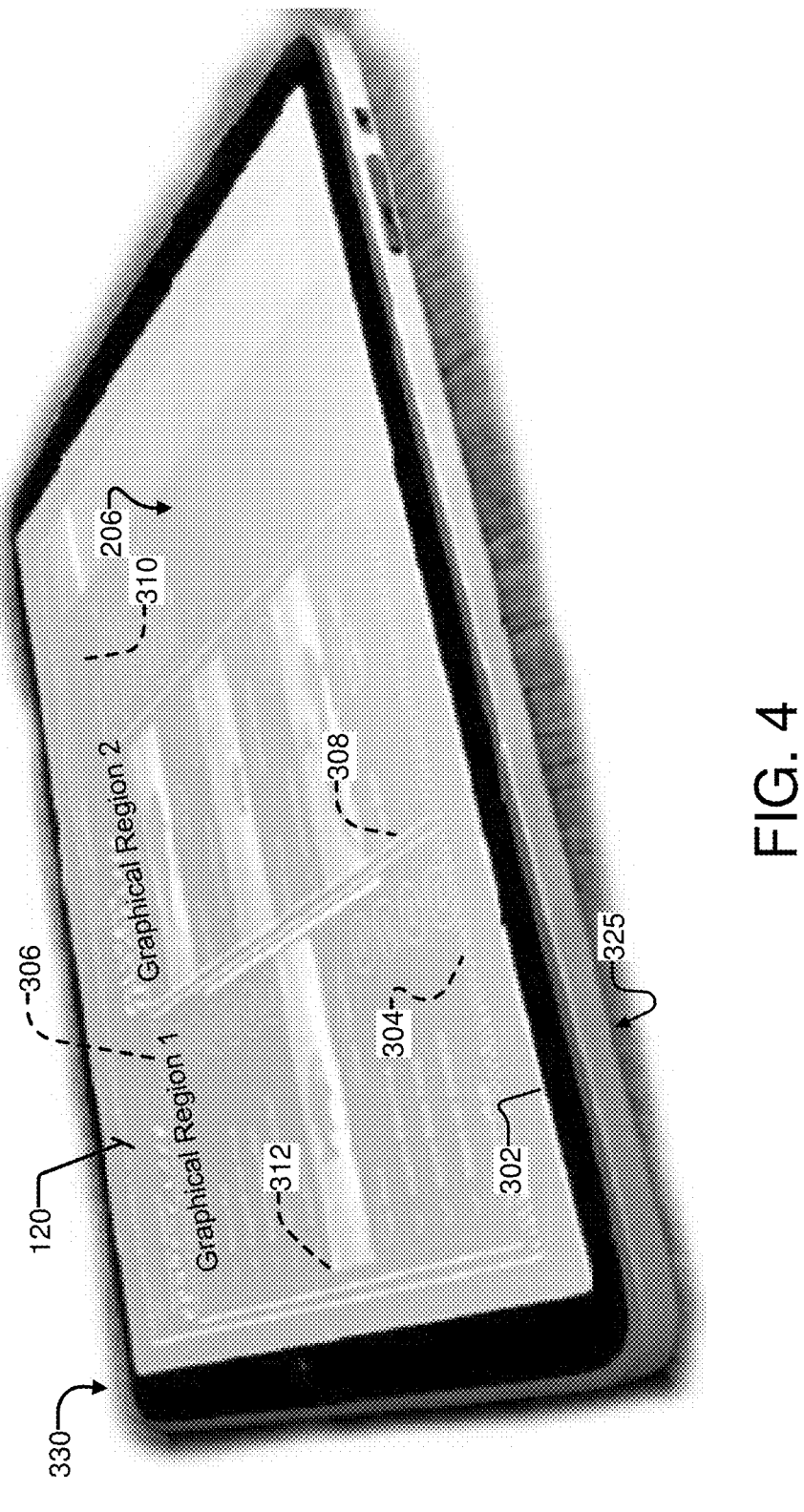
FIG. 4 is a visualization of a virtual assessment implemented with the GUI of FIG. 2 and a first physical overlay, in accordance with some implementations.

FIGS. 4 & 5: Conducting the Assessment

FIG. 4 is a visualization of a virtual assessment implemented with the GUI of FIG. 2 and a physical overlay 120, in accordance with some implementations. As illustrated, a tablet computer 325 having display bezel 330 is provided by a person, or provided to the person, being assessed. Upon initialization of the assessment, a first physical overlay 120 is placed on the display such that it appropriately aligns with graphical regions of the GUI 200. A proctor or non-visually impaired assistant may help initially place the first overlay 120 onto the device 325.

Once the assessment is begun, a person may touch, feel, manipulate, and depress against the physical overlay on the device 325. Furthermore, other overlays 120 may also be available for replacing the first overlay as a student continues through an assessment.

As a user interacts with the assessment through the device 325, information may be recorded regarding how the user approaches the task and/or the processes in which the user solves and engages in during the task. For example, FIG. 5 illustrates an example data structure 500 for aggregating user assessment scores, in accordance with some implementations. As illustrated, the data structure 500 may be organized as a table, although other formats are acceptable.

The recorded information may include the user's telemetry data, e.g. finger/mouse movements, clicks, presses, swipes, choices, timestamps, and other suitable telemetry data. The user's telemetry data may be analyzed and processed via item-level scoring algorithms and psychometric scoring models to make claims about a user's cognitive processes and/or overall performance. In addition to analysis of the user's telemetry data for correct or incorrect answers, the user's telemetry data may be analyzed to understand how the user solved a problem and/or what strategies he or she engaged in to solve the problem. This novel approach to cognitive testing in a given domain, e.g., the educational domain, may provide an abundance of information to better assess which students are likely to succeed in a given field of study.

Additionally, assessment scores are determined to quantify how a user's actions, timestamps, and performance within each scenario relate to various cognitive constructs. Cognitive science, educational psychology, and learning science theories may guide the mapping of each score to relevant constructs. The scores may focus both on the product (e.g., right or wrong) and on the process (e.g., how did they get there, what choices did they make, how many mistakes did they correct), which is more nuanced than traditional cognitive assessments.

Accordingly, for each user 501 being assessed, an individual aggregated assessment score 503 may be created and stored in the table 500 for presentation to an instructor after the assessment 105 is completed. The aggregated score may be a simple sum, a weighted average, or any other aggregate or computation that closely reflects an actual assessment of a student's skills and performance, as opposed to their particular knowledge base.

Hereinafter, the methodology of providing accessible computer-user scenarios in assessments is described more fully with reference to FIG. 6.

Figure 6:
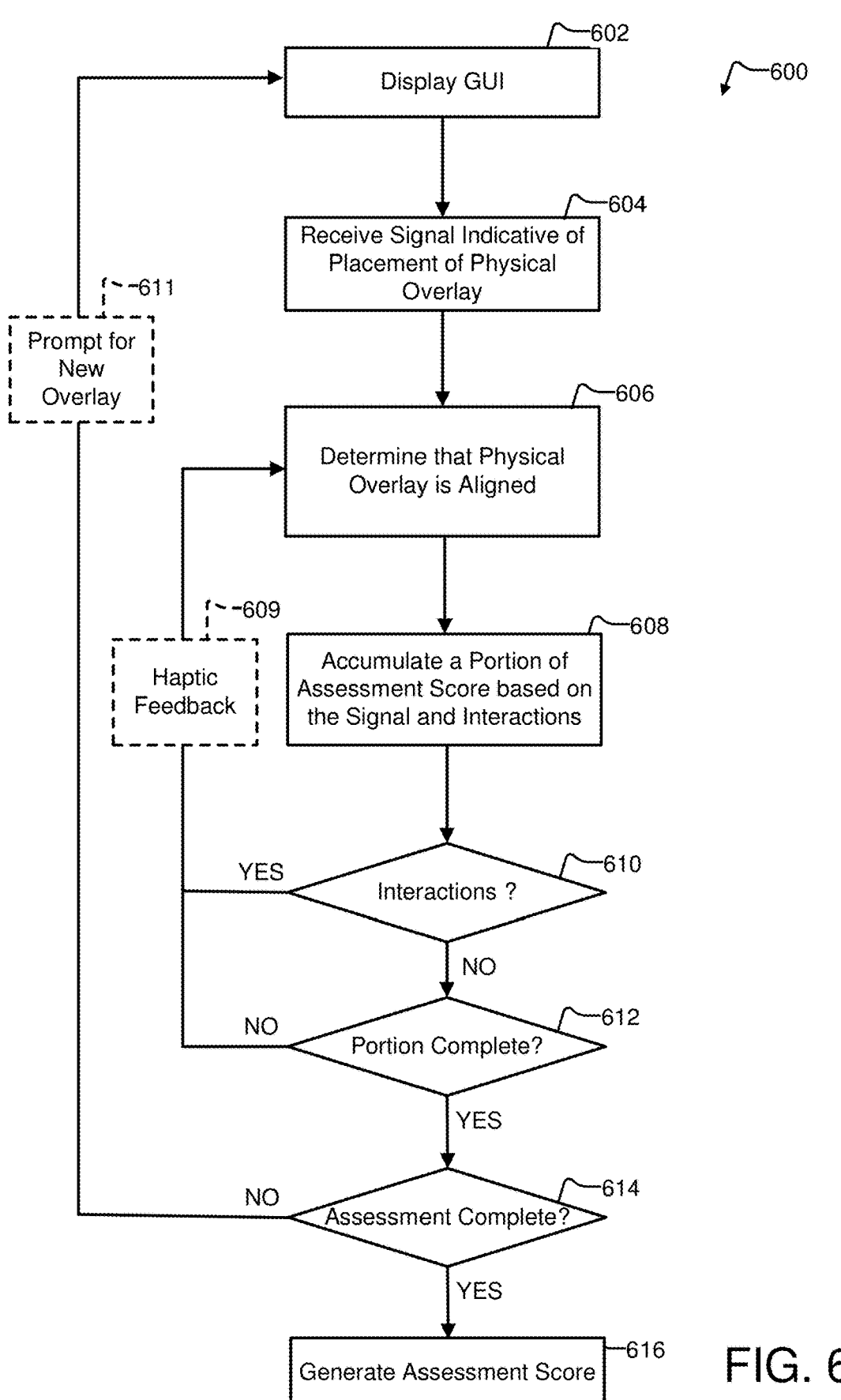
FIG. 6 is a flowchart of an example method for accessible computer-user scenarios, in accordance with some implementations.

FIG. 6: Example Method of Accessible Computer-User Interactions

FIG. 6 is a flowchart of an example method for accessible computer-user scenarios, in accordance with some implementations. In some implementations, method 600 can be implemented, for example, on a server system, e.g., online assessment platform 102 as shown in FIG. 1. In some implementations, some or all of the method 600 can be implemented on a system such as one or more client devices 110 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 600. Method 600 may begin at block 602.

In block 602, a GUI (e.g., GUI 200) is displayed on a display screen (e.g., display screen 402) or display device. The GUI can include a virtual assessment 105 that is representative of an assessment examination. The GUI can also include one or more graphical regions(s) (e.g., graphical regions 1 through N) that represent a portion of a logical problem of the assessment. Block 602 may be followed by block 604.

In block 604, a signal indicative of placement of a physical overlay onto the display screen, above the graphical regions, is received. Generally, an initial placement by a proctor may signal the assessment has begun. However, other subsequent placements and/or activation of controls 225 may also indicate the assessment has begun or trigger the beginning of the assessment. Block 604 may be followed by block 606.

In block 606, alignment of the overlay may be determined and/or confirmed. For example, during assessment, a person may physically slide, shift, press, or otherwise manipulate the physical overlay on the display screen. Upon detecting movement, the method can include prompting for re-alignment (e.g., through haptic feedback). Otherwise, the assessment may continue.

Additionally, according to at least one implementation, an overlay may include one or more at least partially conductive areas disposed in alignment with at least one of the border 302 and/or embossed regions thereon. In this manner, a capacitive touch screen may register one or more conductive portions on the physical overlay as touch inputs (e.g., as if a finger was placed there). Thereafter, depending upon a location of the registered conductive portions, the method may include determining that those one or more conductive portions are appropriately aligned with the underlying GUI. The conductive portions may be facilitated by one or more segments, pieces, or remnants of conductive tape, conductive paint, or other conductive material at least partially affixed to the physical overlay. However, other implementations may not necessarily include one or more conductive portions or areas. Block 606 may be followed by block 608.

In block 608, at least a portion of an assessment score is accumulated or tabulated based on the signal and the interactions of a student with the overlay and underlying GUI. For example, as illustrated in FIG. 5, assessment scores may be aggregated as a person completes different portions of the assessment. Furthermore, telemetry data based on shifting, pushing, or otherwise manipulating the GUI may also be recorded to gauge other aspects of a person's assessment such as speed, agility, comprehension, mistakes, etc. Additionally, as illustrated in FIG. 5, a user's telemetry data (based at least in part of an alignment signal, movement/repositioning graphical elements, and/or interactions with the physical overlay(s)) may together inform an item-level score, and then many item scores comprise a whole assessment score. Block 608 may be followed by blocks 610, 612, and 614.

At block 610, a determination is made as to whether interactions with the GUI are detected. If interactions are detected, haptic feedback may be provided at block 609 followed by repetition or iteration of block 606.

At block 612, (e.g., if no interaction was detected) a determination is made as to whether the contemporaneous portion of the assessment is complete. If the portion is not complete, the assessment may continue at blocks 606-612, in any manner of repetition until complete. If the portion is complete, but the assessment is not complete, a prompt for a new overlay may be provided at block 611, and the assessment may continue at blocks 602-614, based on the newly placed overlay and associated GUI.

If the assessment is complete, a final assessment score is generated at block 616.

Blocks 602-616 can be performed (or repeated) in a different order than described above and/or one or more blocks can be omitted, supplemented with further block(s), combined together, modified, etc. Hereinafter, assessment creation is described with reference to FIG. 7.

Figure 7:
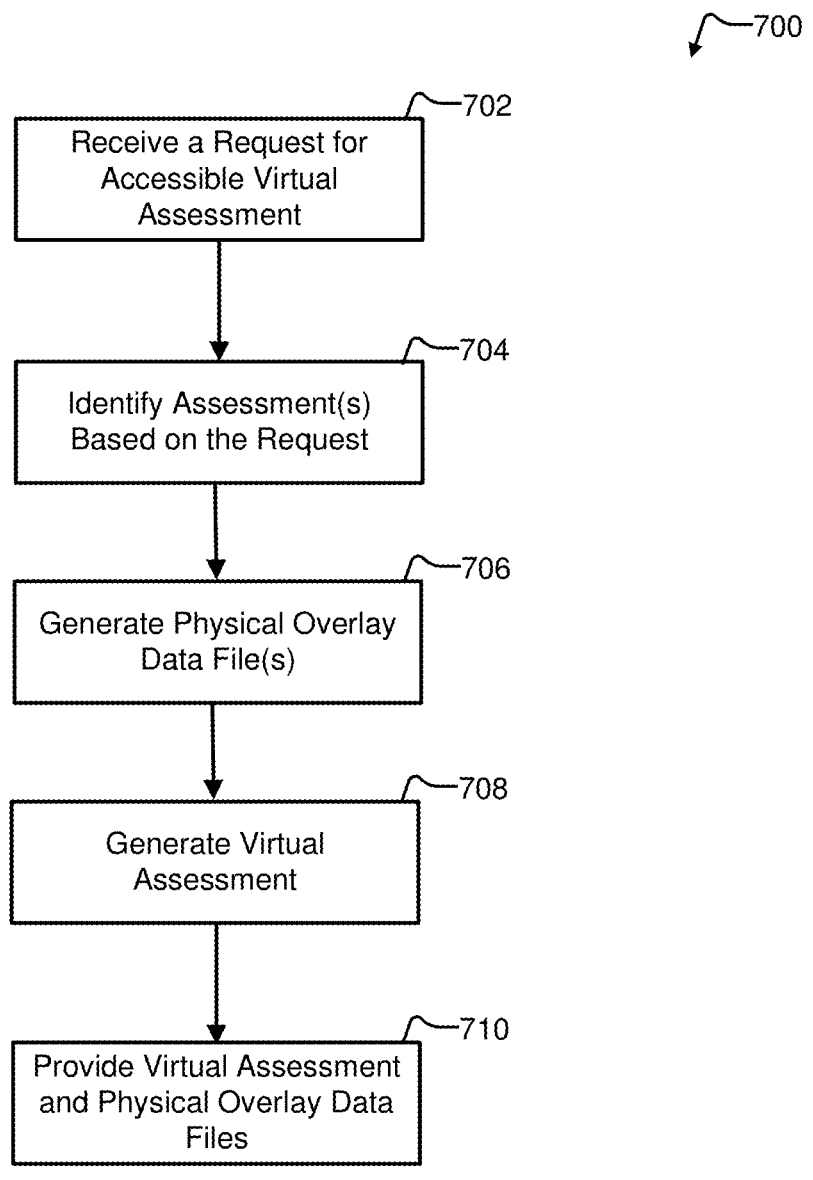
FIG. 7 is a flowchart of an example method for creating accessible computer-user scenarios, in accordance with some implementations.

FIG. 7: Creating Assessments and Content

FIG. 7 is a flowchart of an example method for creating accessible computer-user interactions, in accordance with some implementations. In some implementations, method 700 can be implemented, for example, on a server system, e.g., online assessment platform 102 as shown in FIG. 1. In some implementations, some or all of the method 700 can be implemented on a system such as one or more client devices 110 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700. Method 700 may begin at block 702.

At block 702, a request for an assessment available on an online assessment platform (e.g., online assessment platform 102) may be received from a user or proctor. For example, the user may utilize a search engine or other interface (e.g., browsing interface) provided by the platform. The list of available items may be stored in the online assessment platform 102, for example, through data store 106, in some implementations. The request may also be embodied as activation or selection of a hyperlink to content available on the online assessment platform (e.g., a link from an external source such as a website, social network, or newsgroup). The hyperlink or "link" may include a direct link or a query including identifying data or other data. Block 702 may be followed by block 704.

At block 704, a particular assessment or content is identified based on the request. For example, if the request is a search query, a list of matching assessments may be returned through a search engine on the online assessment platform. Similarly, a database query may be performed to identify one or more assessments or other content items. Block 704 may be followed by block 706.

At block 706, a physical overlay data file may be generated. The physical overlay data file may include a sequence of printing/removal/Braille/embossing operations necessary to recreate a physical overlay on a printer, or other manufacturing apparatus. Additionally, according to at least one implementations, the physical overlay data file may include data representing one or more locations where an at least partially conductive trace, such as conductive tape or paint, should be applied to facilitate alignment determinations by a capacitive touchscreen device or other display device. Furthermore, conductive traces may not necessarily be applied for all implementations, for example, if automatic determination of alignment is not implemented. Other determinations of alignment may include inspection by a proctor or other person, and/or activation/selection of an additional GUI element such as one or elements 225 to signal proper alignment. Block 706 may be followed by block 708.

At block 708, a virtual assessment may be generated. For example, and as described above, each individual's assessment may be tailored according to a variety of factors. Thus, the method 700 may facilitate customization through additions, subtractions, combinations, and any other manner. Block 708 may be followed by block 710.

At block 710, the virtual assessment created at block 708 and the physical overlay data file(s) may be provided to the requestor.

Blocks 702-710 can be performed (or repeated) in a different order than described above and/or one or more blocks can be omitted, supplemented with further block(s), combined together, modified, etc. Methods 600 and/or 700 can be performed on a server (e.g., 102) and/or a client device (e.g., 110). Furthermore, portions of the methods 600 and 700 may be combined and performed in sequence or in parallel, according to any desired implementation.

As described above, the techniques of presenting GUIs of scenarios or tasks may be embedded within the simulation-based assessment that abstract the context of a given environment, e.g., a learning environment, while maintaining opportunities for a user to portray problem-solving capabilities required by a field of study. Through scenarios that take place in the simulation-based assessment, details of a user's cognitive processes, not just end choices, may be observed. The aggregation of the assessment score including a multitude of telemetry data bolsters the applicability of the assessment to determine how capable a person is in solving particular problems, working in groups, following spoken instructions from another person or computer, and/or other attributes which may be representative of a field of study, job, or vocation.

Hereinafter, a more detailed description of various computing devices that may be used to implement different devices illustrated in FIG. 1 is provided with reference to FIG. 8.

Figure 8:
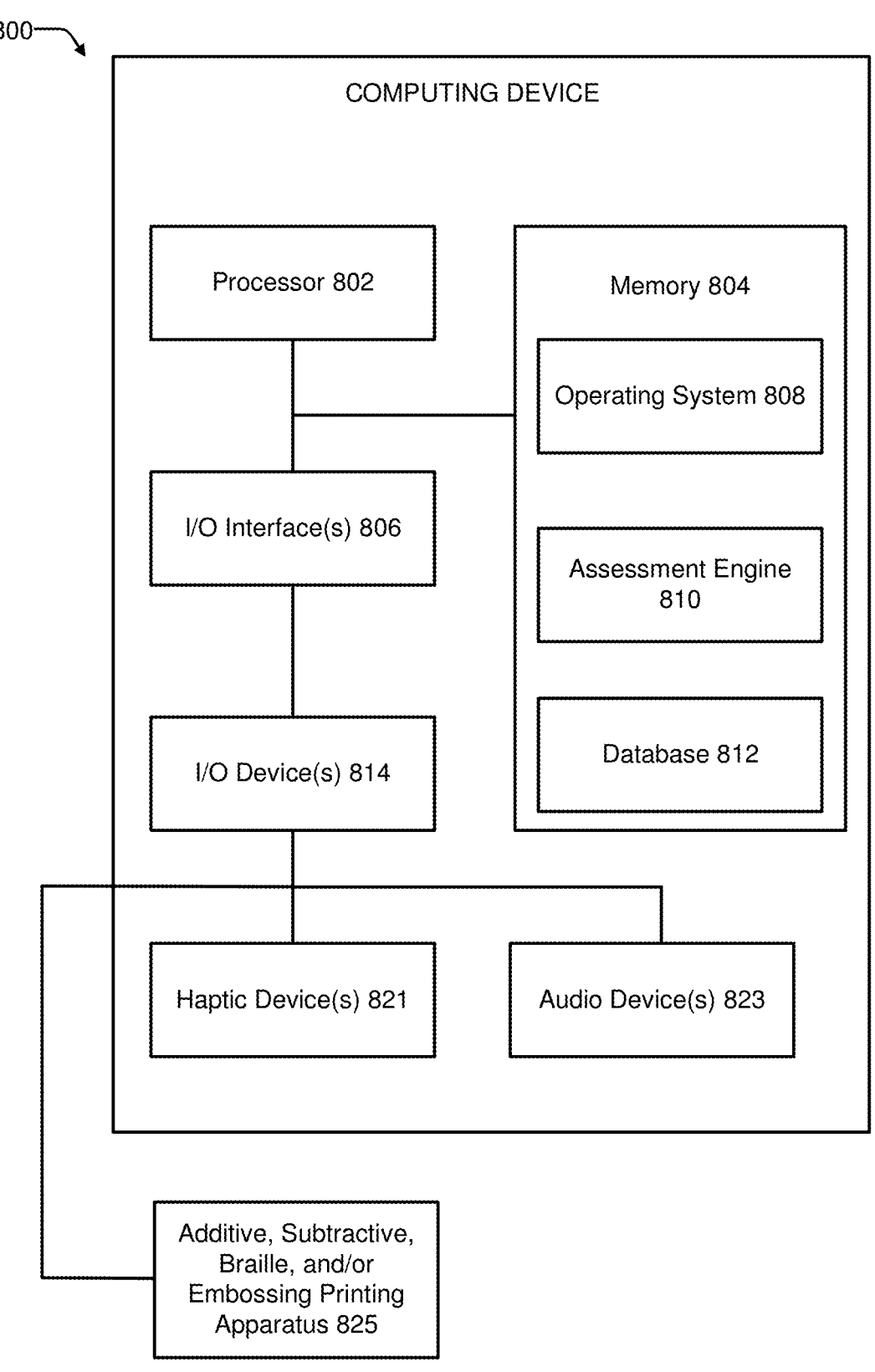
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., online assessment platform 102 and client device 110 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.), haptic devices 821 (e.g., actuators, vibrating motors, solenoids, etc.), and/or audio devices 823 (e.g., speech synthesis devices and/or speakers).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 802 and/or integrated therewith. Memory 804 can store software operating on the server device 800 by the processor 802, including an operating system 808, an assessment engine application 810 and associated data 812. In some implementations, the assessment engine application 810 can include instructions that enable processor 802 to perform or control performance of the functions described herein, e.g., some or all of the methods of FIGS. 6 and 7. In some implementations, the assessment engine application 810 may also include one or more machine learning models for generating new assessments, new digital assets, new virtual representations of physical overlays, and for providing user interfaces and/or other features of the platform, as described herein.

For example, memory 804 can include software instructions for an assessment engine 810 that can provide assessments including intuitive haptic feedback and audio speech synthesis. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For example, an additive or subtractive, Braille, and/or embossing printing apparatus 825 may be controlled through the I/O interface 806. Suitable printing apparatuses may include 3D printers using resin, filament, or other additive techniques. Suitable subtractive processes may include CNC lathes, mills, and/or routers. Suitable Braille and embossing printers may include any available printer capable of embossing raised edges or portions in at least partially flexible material.

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online assessment platform 102 is described as performing operations as described in some implementations herein, any suitable component or combination of components of online assessment platform 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processors, application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., user demographics, user behavioral data during an assessment, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of accessible computer-user scenarios, the method comprising:

displaying a graphical user interface on a display screen, wherein the graphical user interface comprises a virtual assessment, wherein the virtual assessment is representative of an assessment examination, and wherein the graphical user interface further comprises a graphical region that represents a portion of a logical problem of the assessment examination;

receiving a first signal indicative of placement of a first physical overlay onto the display screen, wherein the first physical overlay comprises an embossed inner region that includes at least one or more of: texture that represents edges of the graphical region, features identifiable by touch that represent edges of the graphical region, or braille embossing that describes at least a portion of the graphical region;

determining, based on the first signal, that the first physical overlay is at least partially aligned with the graphical region;

receiving and storing computer-user interactions between a user that physically interacts with the at least partially aligned first physical overlay and the graphical user interface;

determining that an incorrect overlay was provided based on selection by the user of a portion of the graphical user interface that does not correspond to any components of the graphical user interface;

responsive to determining that the incorrect overlay was provided, audibly prompting a request for confirmation that the first physical overlay corresponds to the graphical user interface;

based on the computer-user interactions, audibly prompting for replacement of the first physical overlay with another physical overlay; and generating a portion of an assessment score based on the stored computer-user interactions.

2. The computer-implemented method of claim 1, wherein the another physical overlay is a second physical overlay, wherein the graphical region is a first graphical region, and wherein the method further comprises:

generating a second graphical region in the graphical user interface;

determining that the second physical overlay is at least partially aligned with the second graphical region;

receiving and storing additional computer-user interactions between the user that physically interacts with the at least partially aligned second physical overlay and the graphical user interface; and generating a complete assessment score based on the stored computer-user interactions and the additional computer-user interactions.

3. The computer-implemented method of claim 1, wherein the first overlay includes an indicator that does not correspond to an indicator being displayed on the graphical user interface.

4. The computer-implemented method of claim 1, wherein the graphical user interface further comprises one or more instructional elements comprising indicia that represent instructions to complete the virtual assessment, and wherein the first physical overlay comprises one or more braille embossments that represent the indicia.

5. The computer-implemented method of claim 4, further comprising:

generating an audio file using a speech synthesizer, wherein the audio file comprises one or more segments of synthesized speech of the instructions to complete the virtual assessment; and audibly playing the audio file.

6. The computer-implemented method of claim 1, further comprising:

generating an audio file using a speech synthesizer, wherein the audio file comprises one or more segments of synthesized speech that describe the logical problem; and audibly playing the audio file responsive to receiving the first signal.

7. The computer-implemented method of claim 1, further comprising:

generating an audio file using a speech synthesizer, wherein the audio file comprises one or more segments of synthesized speech that describe the graphical region; and audibly playing the audio file responsive to determining that the first physical overlay is at least partially aligned with the graphical region.

8. The computer-implemented method of claim 1, further comprising:

responsive to audibly prompting the request for confirmation, receiving a second signal indicative of placement of a second physical overlay onto the display screen;

receiving and storing additional computer-user interactions between the user that physically interacts with the second physical overlay and the graphical user interface; and generating a complete assessment score based on the stored computer-user interactions and the additional computer-user interactions.

9. The computer-implemented method of claim 1, further comprising periodically audibly playing synthesized speech that describes a state of the virtual assessment.

10. The computer-implemented method of claim 1, further comprising periodically applying haptic feedback responsive to the computer-user interactions.

11. A system of accessible computer-user scenarios, the system comprising:

a display device configured to display a graphical user interface, wherein the graphical user interface comprises a virtual assessment, wherein the virtual assessment is representative of an assessment examination, and wherein the graphical user interface further comprises a graphical region that represents a portion of a logical problem of the assessment examination;

a memory with instructions stored thereon; and a processing device, coupled to the memory and to the display device, wherein the processing device is configured to access the memory and execute the instructions, and wherein the instructions, in response to execution by the processing device, cause the processing device to perform or control performance of operations comprising:

receiving a first signal indicative of placement of a first physical overlay onto the display device, wherein the first physical overlay comprises an embossed inner region that includes at least one or more of: texture that represents edges of the graphical region, features identifiable by touch that represent edges of the graphical region, or braille embossing that describes at least a portion of the graphical region;

determining, based on the first signal, that the first physical overlay is at least partially aligned with the graphical region;

receiving and storing computer-user interactions between a user that physically interacts with the at least partially aligned first physical overlay and the graphical user interface;

determining that an incorrect overlay was provided based on selection by the user of a portion of the graphical user interface that does not correspond to any components of the graphical user interface;

responsive to determining that the incorrect overlay was provided, audibly prompting a request for confirmation that the first physical overlay corresponds to the graphical user interface;

based on the computer-user interactions, audibly prompting for replacement of the first physical overlay with another physical overlay; and generating a portion of an assessment score based on the stored computer-user interactions.

12. The system of claim 11, wherein the operations further include:

responsive to audibly prompting the request for confirmation, receiving a second signal indicative of placement of a second physical overlay onto the display device;

receiving and storing additional computer-user interactions between the user that physically interacts with the second physical overlay and the graphical user interface; and generating a complete assessment score based on the stored computer-user interactions and the additional computer-user interactions.

13. The system of claim 11, further comprising an embossing or Braille printing apparatus configured to physically print one or more copies of the first physical overlay.

14. The system of claim 13, wherein the operations further comprise:

generating a data file representative of a printing sequence of a copy of the first physical overlay; and transmitting the data file to the embossing or Braille printing apparatus.

15. The system of claim 11, wherein the another physical overlay is a second physical overlay, wherein the graphical region is a first graphical region, and wherein the operations further comprise:

generating a second graphical region in the graphical user interface;

determining that the second physical overlay is at least partially aligned with the second graphical region;

receiving and storing additional computer-user interactions between the user that physically interacts with the at least partially aligned second physical overlay and the graphical user interface; and generating a complete assessment score based on the stored computer-user interactions and the additional computer-user interactions.

16. The system of claim 11, wherein the assessment examination is a test for assessment of a student or a vocational assessment examination for assessment of a vocational candidate.

17. The system of claim 11, wherein the graphical user interface further comprises one or more instructional elements comprising indicia that represent instructions to complete the virtual assessment, and wherein the first physical overlay comprises one or more braille embossments that represent the indicia.

18. The system of claim 17, wherein the operations further comprise:

generating an audio file using a speech synthesizer, wherein the audio file comprises one or more segments of synthesized speech of the instructions to complete the virtual assessment; and audibly playing the audio file.

19. The system of claim 11, wherein the operations further comprise:

generating an audio file using a speech synthesizer, wherein the audio file comprises one or more segments of synthesized speech that describe the logical problem; and audibly playing the audio file responsive to receiving the first signal.

20. The system of claim 19, wherein the operations further comprise:

generating an audio file using a speech synthesizer, wherein the audio file comprises one or more segments of synthesized speech that describe the graphical region; and audibly playing the audio file responsive to determining that the first physical overlay is at least partially aligned with the graphical region.

* * * * *